United States Patent
Borreill

[15] 3,692,286
[45] Sept. 19, 1972

[54] APPARATUS FOR THE MANUFACTURE OF SUPER-WHITE CEMENTS

[72] Inventor: Andre B. Borreill, Montelimar, France

[73] Assignee: Societe Anonyme: Ciments Lafarge, Paris, France

[22] Filed: July 31, 1970

[21] Appl. No.: 59,884

[30] Foreign Application Priority Data

Feb. 9, 1970 France.......................7004502

[52] U.S. Cl. ..............................263/32 R, 263/53 R
[51] Int. Cl.................................................F27b 7/20
[58] Field of Search............................263/32, 33, 53

[56] References Cited

UNITED STATES PATENTS

| | | |
|---|---|---|
| 3,473,794 | 10/1969 | Elkjaer.....................263/53 X |
| 909,464 | 1/1909 | Semper........................263/33 |
| 3,425,853 | 2/1969 | Rives.......................263/53 X |
| 1,925,875 | 9/1933 | McLaughlin et al.....263/32 X |

Primary Examiner—John J. Camby
Attorney—Brumbaugh, Graves, Donohue & Raymond

[57] ABSTRACT

Apparatus for manufacturing superwhite cement from clinker, comprises an inclined rotating drum divided by an apertured partition into upstream and downstream compartments, a crusher delivering hot clinker and nozzles delivering hot reducing gas into the outer end of the upstream chamber, spray nozzles to introduce water vapor into the outer end of the downstream chamber, and closures sealing the ends of the drum from the outside atmosphere.

12 Claims, 3 Drawing Figures

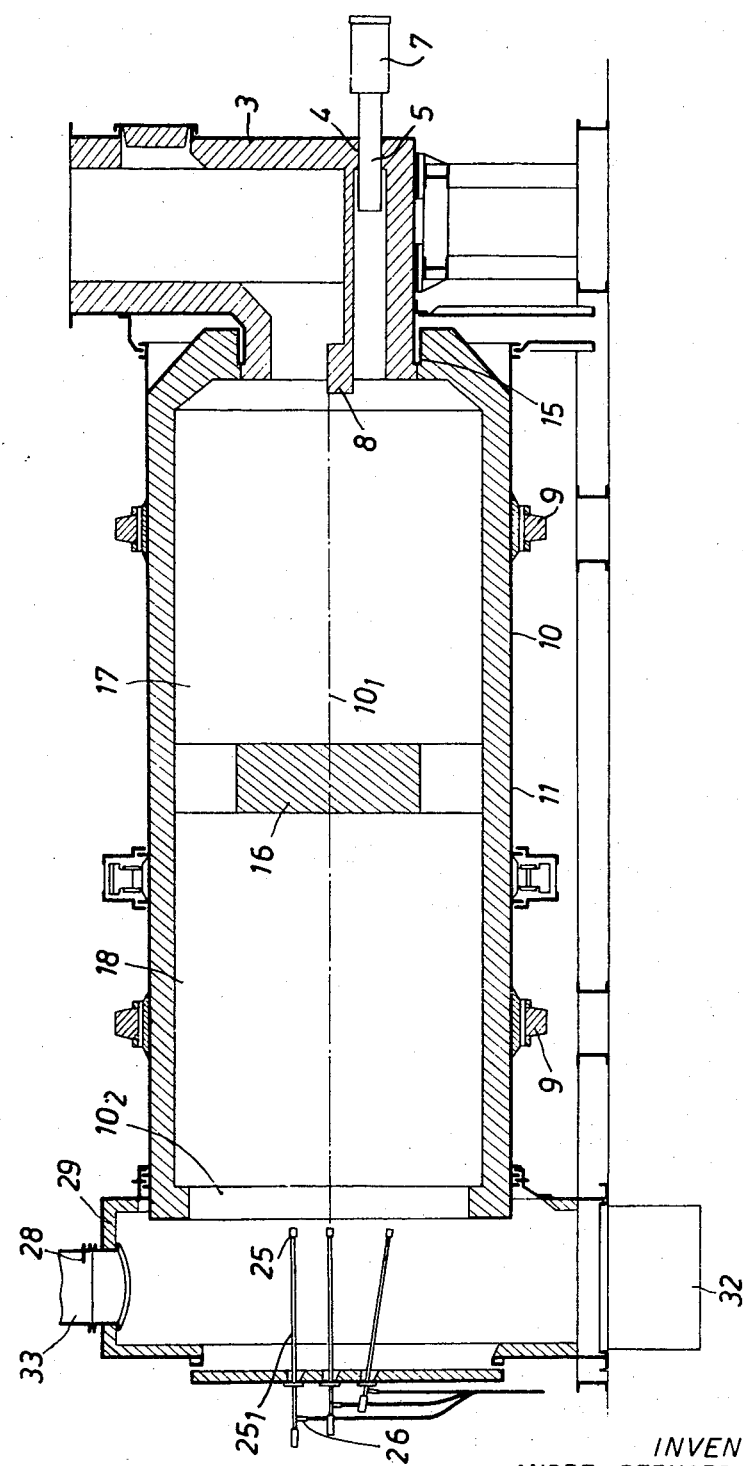

3,692,286

APPARATUS FOR THE MANUFACTURE OF SUPER-WHITE CEMENTS

The present invention relates to improvements in the manufacture of super-white cements; it relates in addition to an apparatus for the carrying out of these improvements as well as to the improved super-white cements thus obtained.

In the copending application Ser. No. 838,192 of Rivoire and Mourros, filed July 1, 1969, now U.S. Pat. No. 3,622,085, there is described a method of manufacturing superwhite cement, comprising firing a suitable raw material in a reducing atmosphere to produce a highly porous clinker, and crushing, bleaching and cooling the clinker, the steps of crushing the clinker whilst at a temperature of 1,000° to 1,450° C., cooling the clinker to 700° – 1100° C. over a period of 1.5 to 6 minutes whilst passing it through a reducing atmosphere, rapidly cooling the clinker to a temperature of approximately 300° C. by the application of atomized water, whilst excluding air, and collecting the clinker without excluding air, the crushed clinker being vibrationnaly conveyed through the reducing and cooling stages.

Also described is apparatus for the production of superwhite cement from hot fired clinker comprising:

a crusher for the hot clinker, a vibrator frame and means to impart vibration to said frame, a tank mounted on said frame with an inclination of about 5°–10° to the horizontal, said tank being divided into an upstream and a downstream chamber by a bulkhead pivotally suspended from the tank by its top edge, and having a bottom wall formed as a number of platforms arranged as a staircase extending downwards from the upstream end to the downstream end of the tank, in the upstream chamber, means for maintaining a reduced atmosphere in said chamber, airtight means connecting said upstream chamber to said crusher, in the downstreamchamber, means for admitting atomized evaporable cooling liquid, a cooling system in the walls of the tanks and, a flue, provided with an adjustable damper, connected to the downstream chamber.

The method and apparatus described above supply a very white clinker which, like the cement produced by the grinding of this clinker, has a brightness or luminance of 87 to 90 (as defined by the International Lighting Committee, taking the value 100 for smoked magnesia) for a Blaine specific surface of 3,000 cm$^2$/g, the starting material being a clinker of medium quality as exemplified in the application. These results are obtained under advantageous economic conditions.

It has now been found that the general economy of the above process and also the brightness of the clinker can be still further improved. The improvements, changes, modifications, and additions made for this purpose to the invention of copending application Ser. No. 838,192, now U.S. Pat. No. 3,622,085, form the object of the present invention.

In the apparatus described in the application referred to the clinker is advanced through the upstream and downstreamchambers by means of the vibration imparted to the vibrator frame and of the staircase formation of the bottom of the chambers.

According to the present invention, apparatus for the production of superwhite cement from hot fired clinker comprises a crusher for the hot clinker, means defining an upstream chamber in fluid-tight connection with the crusher, and a downstream chamber in substantially fluid-tight connection said upstream chamber, said chambers being defined so as to incline downwardly from the crusher, means for maintaining an atmosphere under pressure in both said chambers and a mainly reducing atmosphere in the upstream chamber, means in the downstream chamber for admitting atomized evaporable cooling fluid, and means for causing the product to progress from the crusher to the outlet of the downstream chamber, wherein the means defining the upstream and downstream chambers is a drum rotatable about an axis inclined downwardly at about 0.5–2 percent to the horizontal from the crusher, a partition being provided approximately midway along the drum and incorporating means to transfer material from the chamber defined upstream of the partition to the chamber defined downstream of the partition, a closure is connected to the upstream end of the drum by a fluid tight peripheral rotary union, said closure comprising a spout guiding crushed clinker from the crusher into the drum and at least one nozzle associated with the spout, said nozzle being directed substantially horizontally into the interior of the drum and connected to a source of hot reducing gas, and a closure is connected to the downstream end of the drum by a fluid tight peripheral rotary union, said closure comprising a plurality of spray jets connected to a source of evaporable liquid, means to evacuate treated clinker from the drum, and a flue.

Preferably the direction of the spray jets is adjustable and means are provided to adjust the supply of liquid thereto. Preferably also the source of hot reducing gas is a liquid or gaseous fuel burner adapted to generate hot gas under superatmospheric pressure e.g. 500 mm water as it is fed to the burner.

The apparatus may in addition have one or more of the following additional features:

1. The partition separating the upstream and the downstream chambers is made of refractory material and provided with at least one aperture situated near its periphery, or preferably at least one symetricaly placed peripheral aperture which is or are inclined towards the axis of rotation of the drum in said downstream chamber, advantageously at an angle of about 45°; these apertures may be provided with deflectors, such as scoops, on the upstream side for the purpose of guiding more material into the corresponding aperture, and on the downstream side in order to free the aperture by diverting therefrom the material already in the downstream chamber.

2. The nozzles for introducing reducing gas into the upstream chamber are provided at their inner end with a protective visor. The gaz used as fuel to provide the reducing gas is advantageously propane. The nozzles may be inclined downwardly in order to reduce the risk of obstruction of these nozzles by clinker dust.

3. The spout has a bottom surface so disposed that the clinker coming from the crusher is directed into the upstream chamber as far as possible from the accumulation formed by the clinker already in the chamber.

4. Means are provided for measuring the temperature of the vapor formed by the liquid (preferably water) sprayed from the jets and to control the supply of liquid in dependance on this temperature.

5. Port-holes, subjected internally to an air blast by any suitable means are provided in at least one of the end closures or in manholes provided in the latter, in order to enable the operation of the apparatus to be supervised.

6. The pressure prevailing throughout the two chambers is of the order of 1 to 20, preferably 1 to 4 mm of water.

7. The speed of rotation of the drum is between 2 and 8 revolutions per minute and preferably approximately 4 revolutions per minute.

The crusher used may be of any known type withstanding a temperature of the order of 1,400° C.; it is advantageously of the type described in the main patent.

It has surprisingly been found that the above-described apparatus, in which the necessity for the use of vibration, with the wear this occasions, as well as the necessity of providing auxiliary means for stirring the clinker, are dispensed with, nevertheless possessed excellent gas tightness, even better than that achieved in apparatus according to copending application Ser. No. 838,192. In particular, it is surprising that with the present apparatus it is possible to obtain a clinker of practically complete homogeneity in respect of all the particles, whether small or large, of the product. In other words, more favorable results, particularly as regards color, which is superior by at least one point (on the scale defined above) to that obtained according to the aforesaid main patent, are obtained very economically.

Apparatus embodying the invention is described below with reference to the accompanying drawings, in which:

FIG. 3 is a view in vertical section on the line III—III in FIG. 2.

Figure 1:
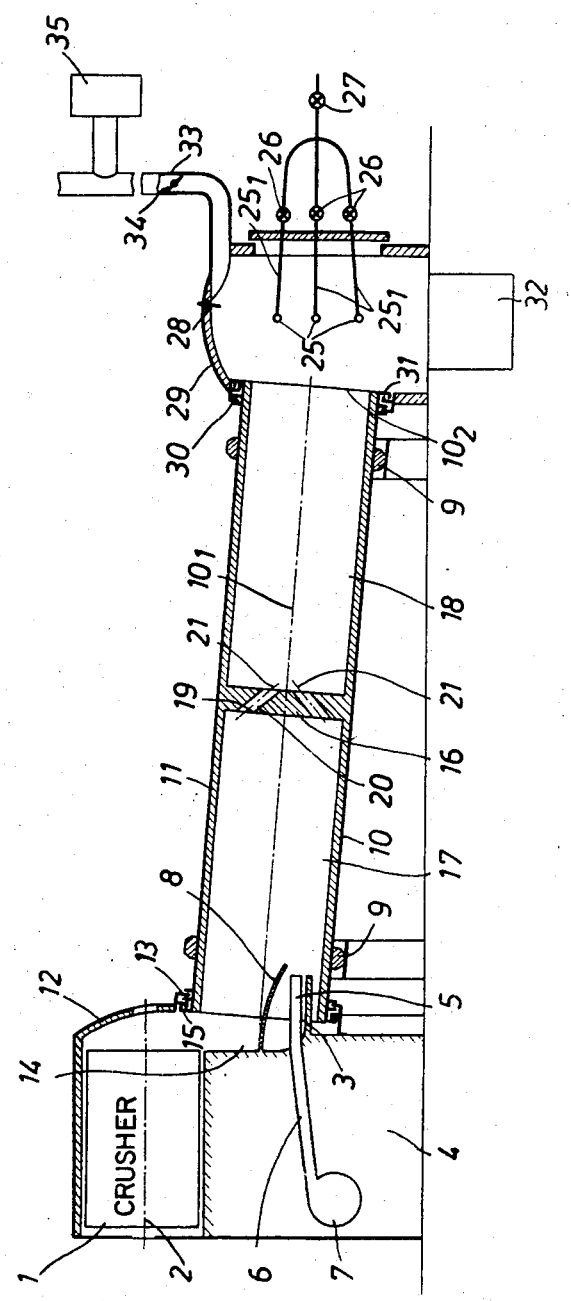
FIG. 1 is a general diagrammatic longitudinal vertical cross-section of the apparatus.
Figure 2:
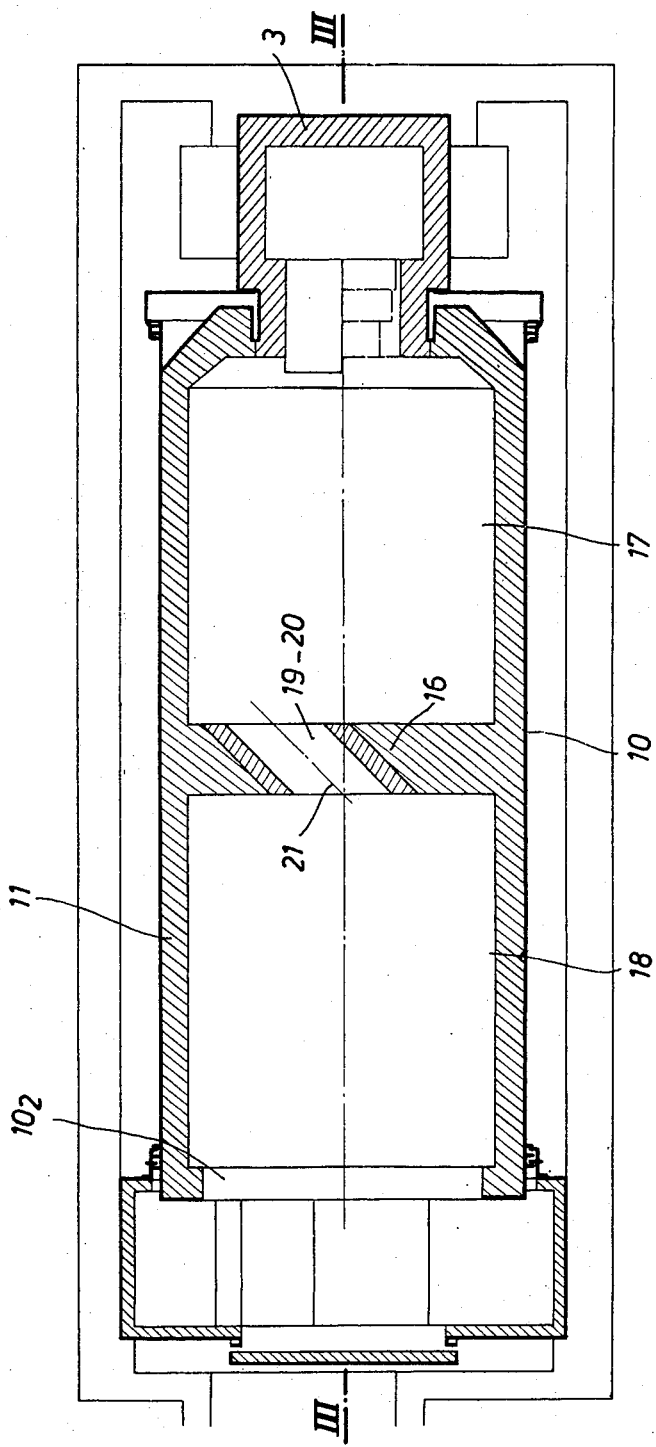
FIG. 2 is a transverse section on the longitudinal axis of an alternative embodiment of the apparatus.

As illustrated, the apparatus is composed of a crusher 1 of the type described in copending application Ser. No. 838,192, now U.S. Pat. No. 3,622,085 in which the main shaft 2 is horizontal. At the outlet of the crusher there is disposed a spout 3, through the bottom wall 4 of which a nozzle 5, which in the example is horizontal, passes. This nozzle 5 is connected by a pipe 6 to a propane gas burner 7, in such a manner that the reducing gases pass out of the nozzle at the required temperature of 1100°-1400° C. for bringing the crushed clinker to a temperature between about 1,200° and 1,300° C. The end of the nozzle 5 is coreved by a visor 8 preventing it from being clogged by clinker falling from the spout 3. The nozzle could be inclined at an angle of about 45° towards the wall of a drum 10, in order to prevent it from being stopped up.

The spout 3 opens into the drum 10, which is inclined on a longitudinal axis by 0.5 to 2 percent in example; the drum 10 rests on rollers 9 which rotate it at a rate of 2–8 revolutions per minute. The inside wall of the drum is lined with a refractory material 11. At its upstream end the drum 10 is provided with a cover 12 forming a rotating joint 13, tightness between the rotating drum 10 and the fixed part 14 being provided by a peripheral rotary union comprising baffles 15.

A transverse partition 16 of refractory material is disposed in the drum 10 midway along its length. This partition 16 bounds an upstream chamber 17 and a downstream chamber 18 in the drum 10. In the partition 16 there are provided two peripheral apertures 19 and 20 which are identical and symmetrical in relation to the axis $10_1$ of the drum. Their axes 21 are inclined by about 45° in relation to the axis $10_1$. The apertures 19 and 20 have the same section over their entire length.

One or more port-holes (not shown) are provided and subjected to an air blast in order to permit inspection and to keep the port-holes clear.

In a downstream cover 29 there are disposed a number of jets 25 (six in the example) disposed near the top wall of the drum 10 and are articulated, for example on knuckle-joints. Each jet is supplied by a water header $25_1$; each jet is controlled individually by a valve 26 and the water supply is provided with a valve 27. Sockets 28 are provided for checking the temperature in the region between the cover 29 of the chamber 18 and a flue 33, either continuously or periodically, and either automatically or other wise. Continuous temperature measurements are checked in relation to a required value and the deviations of the actual temperatures or their mean (produced by any known means) in relation to this value are transmitted by any suitable known means in order to control the supply of water. It would also be possible if desired to measure not only the temperature prevailing adjacent the flue but also elsewhere in the chamber 18, and the results of these measurements could be used to control the supply of gas and/or the rotational drive of the drum.

The downstream outlet $10_2$ of the drum is surrounded by the aforesaid cover 29 forming a rotating joint 30, the seal between the drum and the cover being obtained by means of a rotary union formed by baffles 31.

The drum 10 delivers through its outlet $10_2$ into one or more receivers 32 which receive the treated, whitened clinker cooled to a temperature of 250° – 300° C. The cover 29 is in addition connected in a fluid-tight manner to the flue 33 provided with a butterfly valve 34 and connected to a dust collecting device 35.

A crushing and bleaching operation was carried out with apparatus of the above-described type having the following characteristics:

Total length of drum 5,700 mm, upstream chamber 2,900 mm, downstream chamber 2,800 mm, diameter 2,600 mm, speed of rotation of crusher 70 revolutions per minute, speed of rotation of drum 1:2 to 8 revolutions per minute.

This apparatus supplied 200–350 tons per day of white clinker from a crude clinker having the following analysis by weight):

| | |
|---|---|
| $SiO_2$ | 14–15% approximately |
| $Al_2O_3$ | about 0.6% |
| $Fe_2O_3$ | about 0.2% |
| CaO | 46–47% approximately |
| MgO | 1% approximately |
| $CO_2$ (in the form of carbonate) | 37% approximately |

The clinker was crushed to a grain size of about 0–40 mm.

The clinker was received in the upstream chamber at a temperature of the order of 1,200°–1,300° C. and remained there for 5 to 7 minutes. During this time it was tumbled and subjected to the action of the reducing gases. Its temperature feel by only about 100°.

On entering the downstream chamber the temperature of the clinker was still about 1,100°. It was then subjected to intensive spraying with water at a rate of about 100 liters per minute which lowered its temperature very rapidly and uniformly, because of the tumbling action of the rotating drum, to about 250°–300°.

The residence time in the downstream chamber was also about 5–7 minutes.

The vapor temperature in this chamber (250° during normal operation) was used as an indication of the temperature of the clinker; the supply of water was controlled on the basis of this vapor temperature.

The reducing gas injected into the upstream chamber through the nozzle or nozzles was supplied from a propane burner and had the following content (by volume):

| | |
|---|---|
| CO | 10–14% |
| $CO_2$ | 5–9% |
| $O_2$ | traces |
| $H_2$ | 1–5% |
| S | about 0.5% |
| $CO/CO_2$ | 1.5–2% |

The clinker obtained had the following analysis (percentages by weight):

| | |
|---|---|
| $SiO_2$ | 24.5–25% |
| $Al_2O_3$ | 2.6–2.5% |
| $Fe_2O_3$ | 0.3% |
| MgO | 0.9% |
| CaO | 71.2–72.2% |
| $TiO_2, MnO_3, Cr_2O_3$ | 0.47%–0.070% |

Under these conditions and on the scale hereinbefore defined, the whiteness obtained was 89.

About 7 kg of propane was consumed per hour, that it to say about one-half or one-third of the consumption of the vibration type apparatus described in application No.

It should be noted that the apparatus is easy to operate, and only occasional adjustments are required, mainly confined to adjustment of the supply of water to the jets (in the case of manual control about 2–3 times per shift). The reference parameter is the vapor temperature, kept at 250° C., for a clinker temperature at the outlet of the apparatus of about 150°. It has been confirmed that this temperature is a preindication of (anticipating by about 15 minutes) the temperature of the clinker at the outlet of the apparatus.

No clogging occurs in the cooling chamber.

It is found that the sealing of the apparatus is very good and that the cooling of the clinker appears to be homogenous, since all the grains, whatever their size, actually have the same color; the grain in whiteness is of the order of one point, but is far greater in terms of the average color and regularity of the color than in terms of the maximum attained under best conditions.

Instead of propane as reducing gas, butane or methane can also be used.

In this specification and claims when referring to fluid-tight connections, it will be of course understood that the connections referred to may permit some passage of gas but are sufficiently restricted so that the pressure within the rotatable drum will exceed ambient pressure during normal operation as a consequence of injection of reducing gas into the upstream chamber and generation of vapors from the cooling liquid within the downstream chamber. This pressure is maintained and controlled by adjusting the degree of restriction of the damper in the exhaust flue from the closure at the downstream end of the drum.

I claim:

1. An apparatus for the production of superwhite cement from a hot clinker comprising:
   1. a crusher for converting said hot clinker into crushed clinker;
   2. a drum rotatable around an axis inclined from the horizontal, said drum thereby having an upper end and a lower end, and said drum being operably connected to means for rotating said drum at a rate effective to cause crushed clinker to move from said upper end to said lower end;
   3. means for transferring said crushed clinker from said crusher to the upper end of said drum, said means providing a substantially fluid-tight connection between said crusher and said drum, and a substantially fluid-tight closure for said upper end;
   4. means for providing a substantially fluid-tight closure for the lower end of said drum and receiving crushed clinker therefrom, said means including flue means;
   5. partition means within said drum which define an upstream chamber, toward the upper end of said drum, and a downstream chamber toward the lower end of said drum, said partition means including means for transferring hot crushed clinker from said upstream chamber to said downstream chamber;
   6. means for maintaining a pressure in said upstream and downstream chambers which is above atmospheric pressure;
   7. means for maintaining a reducing atmosphere in said upstream chamber; and
   8. means for admitting an atomized evaporable cooling fluid into said downstream chamber.

2. An apparatus according to claim 1 wherein the axis around which said drum is rotated is inclined at about 0.5 to 2 percent to the horizontal.

3. An apparatus according to claim 1, wherein said means (3) for transferring crushed clinker includes a spout and said means (7) for maintaining a reducing atmosphere in said upstream chamber includes a nozzle associated with said spout directed substantially horizontally into said upper chamber, said nozzle being operably connected to a supply of a hot reducing gas.

4. An apparatus according to claim 1 wherein said means (8) for admitting an atomized evaporable fluid comprises a plurality of spray jets connected to a source of evaporable liquid, said spray jets extending into said downstream chamber through said closure (4).

5. An apparatus according to claim 1, wherein the partition separating the upstream and downstream chambers is made of refractory material and provided with at least one aperture situated near the periphery.

6. An apparatus according to claim 1 wherein the partition separating the upstream and downstream chambers is made of refractory material and provided with at least one symmetrical peripheral aperture inclined toward the axis of rotation of said drum (2) in said downstream chamber.

7. An apparatus according to claim 6 wherein the inclination of the apertures is about 45°.

8. An apparatus according to claim 6 wherein the partition is provided adjacent the apertures with scoops, on the upstream side, thereby introducing more material into the corresponding aperture, and with deflectors on the downstream side whereby to divert material already in the downstream chamber away from the apertures.

9. Apparatus according to claim 3, wherein the nozzle for introducing reducing gas into the upstream chamber is provided at its discharge ends with a protective visor.

10. Apparatus according to claim 3, wherein the bottom of the spout is configured to direct clinker coming from the crusher into the upstream chamber as far as possible from clinker already accumulated in the chamber.

11. An apparatus according to claim 4, wherein means are provided to measure the temperature of the vapor formed by the spraying water coming from the jets and to control the supply of water in dependence on this temperature.

12. A device according to claim 1, wherein portholes are provided in at least one of the end closures and means are provided to subject the interior of said portholes to an air blast.

* * * * *